(12) United States Patent
Caram et al.

(10) Patent No.: US 12,050,807 B2
(45) Date of Patent: Jul. 30, 2024

(54) MEMORY MANAGEMENT SYSTEM AND METHOD

(71) Applicant: EMC IP Holding Company, LLC, Hopkinton, MA (US)

(72) Inventors: Bruce E. Caram, Hudson, MA (US); Vamsi K. Vankamamidi, Hopkinton, MA (US); Philippe Armangau, Acton, MA (US); Ajay Karri, South Grafton, MA (US)

(73) Assignee: EMC IP Holding Company, LLC, Hopkinton, MA (US)

( * ) Notice: Subject to any disclaimer, the term of this patent is extended or adjusted under 35 U.S.C. 154(b) by 22 days.

(21) Appl. No.: 17/239,281

(22) Filed: Apr. 23, 2021

(65) Prior Publication Data

US 2022/0342599 A1   Oct. 27, 2022

(51) Int. Cl.
*G06F 12/00* (2006.01)
*G06F 3/06* (2006.01)

(52) U.S. Cl.
CPC .......... *G06F 3/0659* (2013.01); *G06F 3/0614* (2013.01); *G06F 3/0635* (2013.01); *G06F 3/0653* (2013.01); *G06F 3/067* (2013.01)

(58) Field of Classification Search
CPC ..... G06F 3/0659; G06F 3/0614; G06F 3/0635
USPC ......................................................... 711/154
See application file for complete search history.

(56) References Cited

U.S. PATENT DOCUMENTS

| | | | |
|---|---|---|---|
| 10,007,685 B2* | 6/2018 | Achar | G06F 16/278 |
| 10,123,230 B1* | 11/2018 | Govindassamy | H04W 56/001 |
| 10,601,881 B1* | 3/2020 | Ghare | H04L 65/762 |
| 2005/0021501 A1* | 1/2005 | Butron | G06F 3/0611 |
| 2006/0294290 A1* | 12/2006 | Raker | G06F 8/656 |
| | | | 711/100 |
| 2008/0126357 A1* | 5/2008 | Casanova | G06F 16/1844 |
| 2017/0286291 A1* | 10/2017 | Thomas | G06F 12/0253 |
| 2018/0121454 A1* | 5/2018 | Kushwah | H04L 67/568 |
| 2019/0042150 A1* | 2/2019 | Wells | G06F 3/0613 |
| 2019/0065092 A1* | 2/2019 | Shah | G06F 3/0617 |
| 2019/0155548 A1* | 5/2019 | Jia | G06F 9/5005 |
| 2019/0265895 A1* | 8/2019 | Okelberry | G06F 3/0644 |
| 2020/0210081 A1* | 7/2020 | Hu | G06F 3/0604 |
| 2021/0109856 A1* | 4/2021 | Lee | G06F 11/3037 |
| 2021/0250268 A1* | 8/2021 | Natarajan | H04W 76/10 |
| 2021/0295584 A1* | 9/2021 | Engh-Halstvedt | G06T 1/20 |
| 2022/0342599 A1* | 10/2022 | Caram | G06F 3/0631 |

* cited by examiner

Primary Examiner — Mohamed M Gebril
(74) Attorney, Agent, or Firm — Brian J. Colandreo; Heath M. Sargeant; Holland & Knight LLP

(57) ABSTRACT

A method, computer program product, and computing system for defining a quantity of discrete storage portions within a storage system; entering an expansion mode during which the discrete storage portions are incrementally assigned to at least one processing node until a first assignment level target is achieved; once the first assignment level target is achieved, entering a utilization mode during which the utilization of the assigned discrete portions is increased until a first utilization level target is achieved; and once the first utilization level target is achieved, reentering the expansion mode during which additional discrete storage portions are incrementally assigned to the at least one processing node until a second assignment level target is achieved.

21 Claims, 4 Drawing Sheets

MEMORY MANAGEMENT SYSTEM AND METHOD

TECHNICAL FIELD

This disclosure relates to storage systems and, more particularly, to systems and methods for managing memory within storage systems.

BACKGROUND

Storing and safeguarding electronic content is of paramount importance in modern business. Accordingly, various methodologies may be employed to protect and distribute such electronic content within storage systems. In order to ensure the consistent performance and operation of these storage systems, the manner in which the available storage within these storage systems is made available to the processing nodes within these storage systems should be monitored and controlled to avoid inefficient use of such storage resources.

SUMMARY OF DISCLOSURE

In one implementation, a computer-implemented method is executed on a computing device and includes: defining a quantity of discrete storage portions within a storage system; entering an expansion mode during which the discrete storage portions are incrementally assigned to at least one processing node until a first assignment level target is achieved; once the first assignment level target is achieved, entering a utilization mode during which the utilization of the assigned discrete portions is increased until a first utilization level target is achieved; and once the first utilization level target is achieved, reentering the expansion mode during which additional discrete storage portions are incrementally assigned to the at least one processing node until a second assignment level target is achieved.

One or more of the following features may be included. Once the second assignment level target is achieved, the utilization mode may be reentered during which the utilization of the assigned discrete portions is increased until a second utilization level target is achieved. Once the second utilization level target is achieved, the expansion mode may be reentered one or more additional times during which additional discrete storage portions are incrementally assigned to the at least one processing node until one or more additional assignment level targets are achieved. Once the one or more additional assignment level targets are achieved, the utilization mode may be entered one or more additional times during which the utilization of the assigned discrete portions is increased until one or more additional utilization level targets are achieved. The at least one processing node may include a plurality of processing nodes within a storage appliance. The plurality of processing nodes within the storage appliance may each enter the expansion mode at essentially the same time. The plurality of processing nodes within the storage appliance may each enter the utilization mode at essentially the same time. When incrementally assigning a discrete storage portion, it may be determined if the discrete storage portion being assigned is the last available discrete storage portion within the storage system. If the discrete storage portion is the last available discrete storage portion within the storage system, the last discrete storage portion may be assigned one sub-portion at a time. If the discrete storage portion is the last available discrete storage portion within the storage system, each of the plurality of processing nodes may be enabled to access at least a sub-portion of the last discrete storage portion.

In another implementation, a computer program product resides on a computer readable medium and has a plurality of instructions stored on it. When executed by a processor, the instructions cause the processor to perform operations including: defining a quantity of discrete storage portions within a storage system; entering an expansion mode during which the discrete storage portions are incrementally assigned to at least one processing node until a first assignment level target is achieved; once the first assignment level target is achieved, entering a utilization mode during which the utilization of the assigned discrete portions is increased until a first utilization level target is achieved; and once the first utilization level target is achieved, reentering the expansion mode during which additional discrete storage portions are incrementally assigned to the at least one processing node until a second assignment level target is achieved.

One or more of the following features may be included. Once the second assignment level target is achieved, the utilization mode may be reentered during which the utilization of the assigned discrete portions is increased until a second utilization level target is achieved. Once the second utilization level target is achieved, the expansion mode may be reentered one or more additional times during which additional discrete storage portions are incrementally assigned to the at least one processing node until one or more additional assignment level targets are achieved. Once the one or more additional assignment level targets are achieved, the utilization mode may be entered one or more additional times during which the utilization of the assigned discrete portions is increased until one or more additional utilization level targets are achieved. The at least one processing node may include a plurality of processing nodes within a storage appliance. The plurality of processing nodes within the storage appliance may each enter the expansion mode at essentially the same time. The plurality of processing nodes within the storage appliance may each enter the utilization mode at essentially the same time. When incrementally assigning a discrete storage portion, it may be determined if the discrete storage portion being assigned is the last available discrete storage portion within the storage system. If the discrete storage portion is the last available discrete storage portion within the storage system, the last discrete storage portion may be assigned one sub-portion at a time. If the discrete storage portion is the last available discrete storage portion within the storage system, each of the plurality of processing nodes may be enabled to access at least a sub-portion of the last discrete storage portion.

In another implementation, a computing system includes a processor and memory is configured to perform operations including: defining a quantity of discrete storage portions within a storage system; entering an expansion mode during which the discrete storage portions are incrementally assigned to at least one processing node until a first assignment level target is achieved; once the first assignment level target is achieved, entering a utilization mode during which the utilization of the assigned discrete portions is increased until a first utilization level target is achieved; and once the first utilization level target is achieved, reentering the expansion mode during which additional discrete storage portions are incrementally assigned to the at least one processing node until a second assignment level target is achieved.

One or more of the following features may be included. Once the second assignment level target is achieved, the utilization mode may be reentered during which the utilization of the assigned discrete portions is increased until a second utilization level target is achieved. Once the second utilization level target is achieved, the expansion mode may be reentered one or more additional times during which additional discrete storage portions are incrementally assigned to the at least one processing node until one or more additional assignment level targets are achieved. Once the one or more additional assignment level targets are achieved, the utilization mode may be entered one or more additional times during which the utilization of the assigned discrete portions is increased until one or more additional utilization level targets are achieved. The at least one processing node may include a plurality of processing nodes within a storage appliance. The plurality of processing nodes within the storage appliance may each enter the expansion mode at essentially the same time. The plurality of processing nodes within the storage appliance may each enter the utilization mode at essentially the same time. When incrementally assigning a discrete storage portion, it may be determined if the discrete storage portion being assigned is the last available discrete storage portion within the storage system. If the discrete storage portion is the last available discrete storage portion within the storage system, the last discrete storage portion may be assigned one sub-portion at a time. If the discrete storage portion is the last available discrete storage portion within the storage system, each of the plurality of processing nodes may be enabled to access at least a sub-portion of the last discrete storage portion.

The details of one or more implementations are set forth in the accompanying drawings and the description below. Other features and advantages will become apparent from the description, the drawings, and the claims.

BRIEF DESCRIPTION OF THE DRAWINGS

Like reference symbols in the various drawings indicate like elements.

DETAILED DESCRIPTION OF THE PREFERRED EMBODIMENTS

Figure 1:
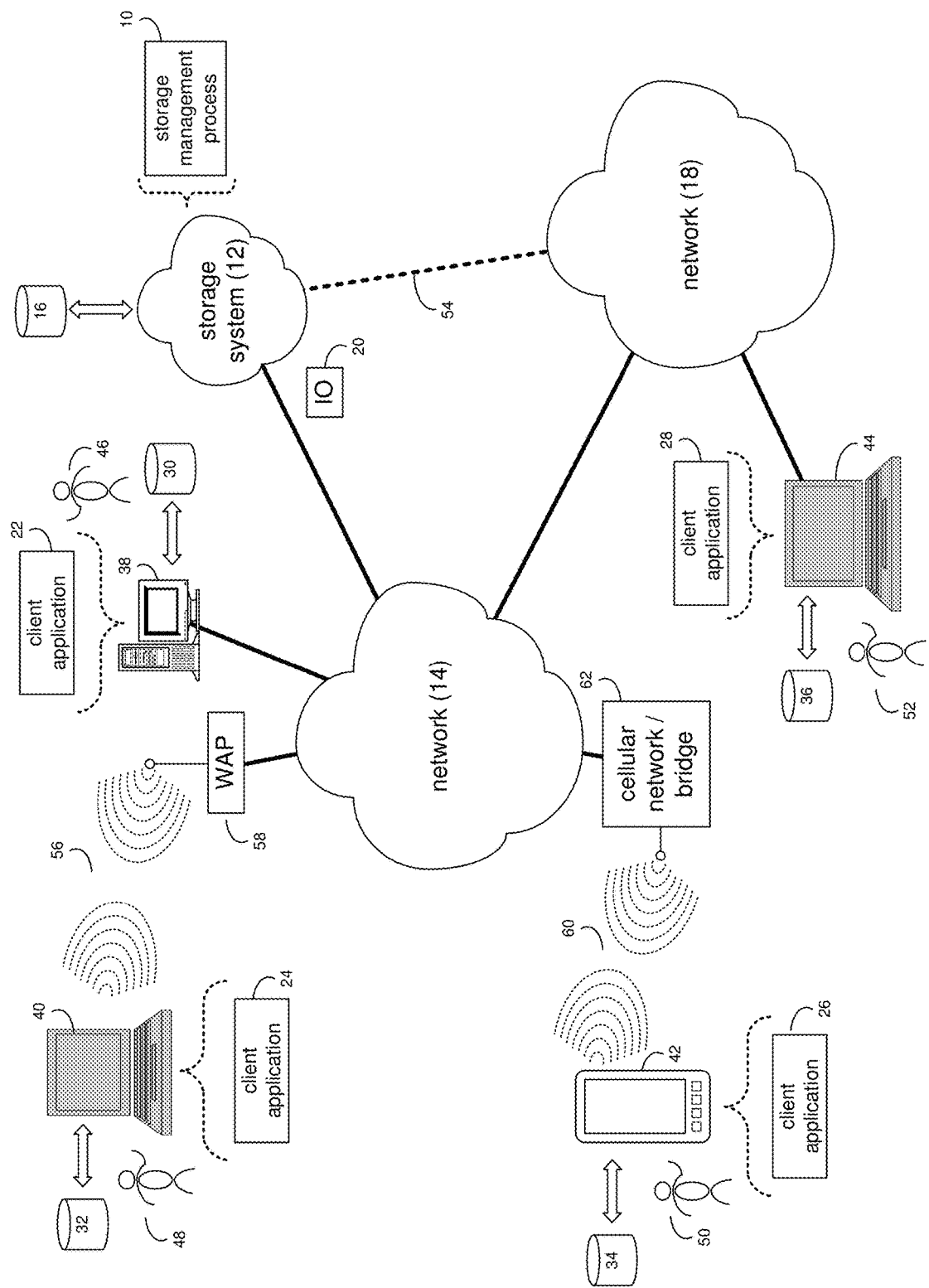
FIG. 1 is a diagrammatic view of a storage system and a storage management process coupled to a distributed computing network.

System Overview:

Referring to FIG. 1, there is shown storage management process 10 that may reside on and may be executed by storage system 12, which may be connected to network 14 (e.g., the Internet or a local area network). Examples of storage system 12 may include, but are not limited to: a personal computer with a memory system, a server computer with a memory system, a Network Attached Storage (NAS) system, a storage appliance, a Storage Area Network (SAN) and a cloud-based device with a memory system.

As is known in the art, a SAN may include one or more of a personal computer, a server computer, a series of server computers, a mini computer, a mainframe computer, a RAID device and a NAS system. The various components of storage system 12 may execute one or more operating systems, examples of which may include but are not limited to: Microsoft Windows Server™; Redhat Linux™, Unix, or a custom operating system, for example.

The instruction sets and subroutines of storage management process 10, which may be stored on storage device 16 coupled to storage system 12, may be executed by one or more processors (not shown) and one or more memory architectures (not shown) included within storage system 12. Storage device 16 may include but is not limited to: a hard disk drive; an optical drive; a RAID device; a random access memory (RAM); a read-only memory (ROM); and all forms of flash memory storage devices.

Network 14 may be connected to one or more secondary networks (e.g., network 18), examples of which may include but are not limited to: a local area network; a wide area network; or an intranet, for example.

Various IO requests (e.g. IO request 20) may be sent from client applications 22, 24, 26, 28 to storage system 12. Examples of IO request 20 may include but are not limited to data write requests (i.e. a request that content be written to storage system 12) and data read requests (i.e. a request that content be read from storage system 12).

The instruction sets and subroutines of client applications 22, 24, 26, 28, which may be stored on storage devices 30, 32, 34, 36 (respectively) coupled to client electronic devices 38, 40, 42, 44 (respectively), may be executed by one or more processors (not shown) and one or more memory architectures (not shown) incorporated into client electronic devices 38, 40, 42, 44 (respectively). Storage devices 30, 32, 34, 36 may include but are not limited to: hard disk drives; optical drives; RAID devices; random access memories (RAM); read-only memories (ROM), and all forms of flash memory storage devices. Examples of client electronic devices 38, 40, 42, 44 may include, but are not limited to, personal computer 38, laptop computer 40, smartphone 42, notebook computer 44, a server (not shown), a data-enabled, cellular telephone (not shown), and a dedicated network device (not shown).

Users 46, 48, 50, 52 may access storage system 12 directly through network 14 or through secondary network 18. Further, storage system 12 may be connected to network 14 through secondary network 18, as illustrated with link line 54.

The various client electronic devices (e.g., client electronic devices 38, 40, 42, 44) may be directly or indirectly coupled to network 14 (or network 18). For example, personal computer 38 is shown directly coupled to network 14 via a hardwired network connection. Further, notebook computer 44 is shown directly coupled to network 18 via a hardwired network connection. Laptop computer 40 is shown wirelessly coupled to network 14 via wireless communication channel 56 established between laptop computer 40 and wireless access point (i.e., WAP) 58, which is shown directly coupled to network 14. WAP 58 may be, for example, an IEEE 802.11a, 802.11b, 802.11g, 802.11n, Wi-Fi, and/or Bluetooth device that is capable of establishing wireless communication channel 56 between laptop computer 40 and WAP 58. Smartphone 42 is shown wirelessly coupled to network 14 via wireless communication channel 60 established between smartphone 42 and cellular network/bridge 62, which is shown directly coupled to network 14.

Client electronic devices 38, 40, 42, 44 may each execute an operating system, examples of which may include but are not limited to Microsoft Windows™, Apple Macintosh™, Redhat Linux™ or a custom operating system.

Figure 2:
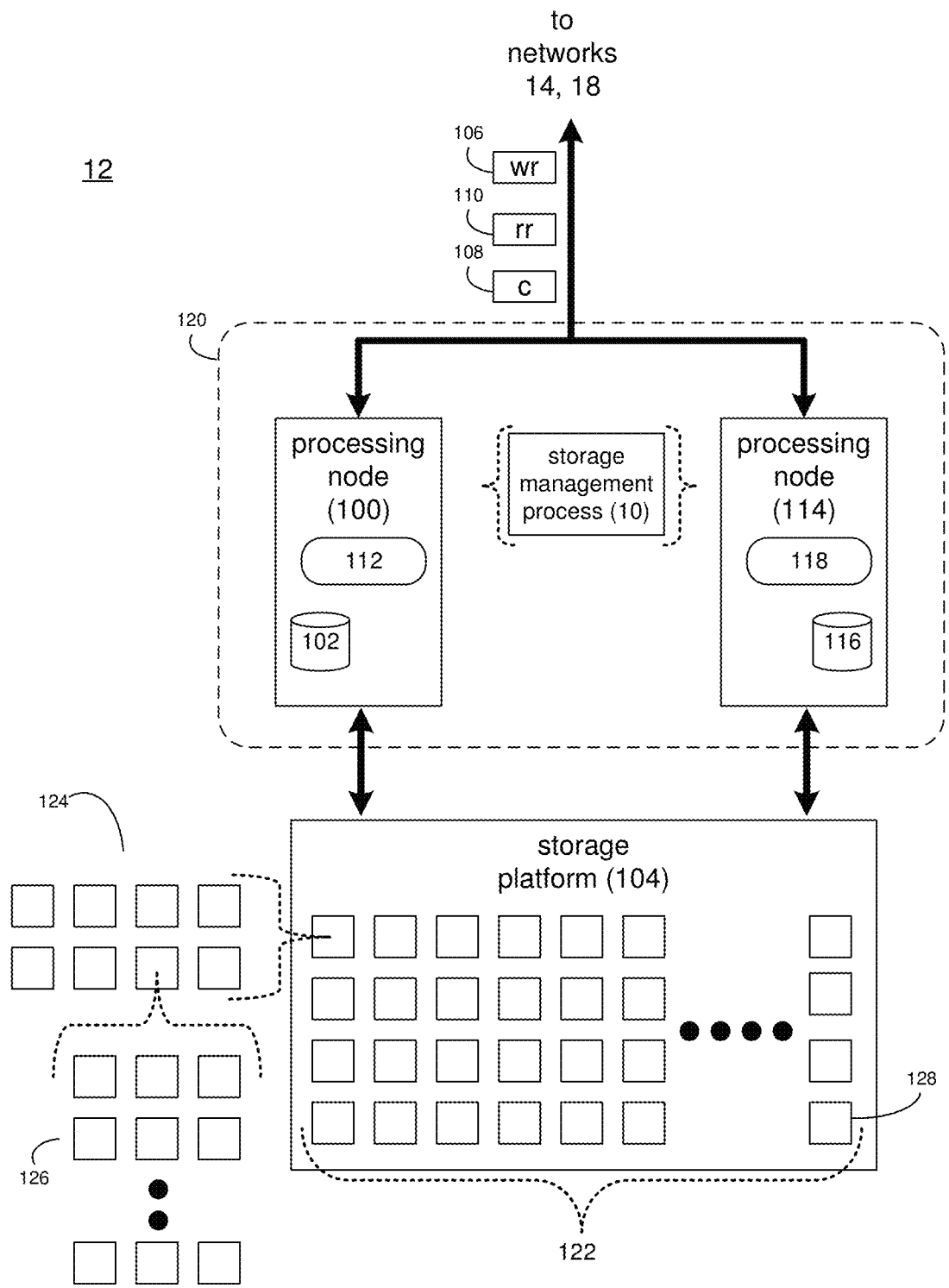
FIG. 2 is a diagrammatic view of the storage system of FIG. 1.

The Data Storage System:

Referring also to FIG. 2, there is shown a general implementation of storage system 12. In this general implementation, storage system 12 may include processing node 100.

An example of processing node 100 may include but is not limited to a processing node within a storage appliance. As is known in the art, a storage appliance is a type of computing appliance that provides data to (or manages data for) other network-connected computing devices. Processing node 100 may be configured to perform computational tasks and may be configured to store data locally (on local storage 102) or within storage platform 104.

Depending upon the manner in which storage system 12 is configured, storage platform 104 may include a single storage device (such as a single hard disk drive or a single solid state storage device) or may include a plurality of storage devices that are configured to provide various levels of performance and/or high availability. For example and if storage platform 104 includes a plurality of storage devices (e.g., hard disk drives and/or solid state storage devices), this plurality of storage devices may be configured to form a RAID storage array utilizing various standard RAID structures (e.g., RAID 0, RAID 1, RAID 3, RAID 5, RAID 6, RAID 7 or RAID 10), thus providing a higher level of performance and/or availability.

Storage system 12 may be configured to execute all or a portion of storage management process 10. The instruction sets and subroutines of storage management process 10, which may be stored on a storage device (e.g., storage device 102) coupled to e.g., processing node 100, may be executed by one or more processors (not shown) and one or more memory architectures (not shown) included within processing node 100. Storage device 102 may include but is not limited to: a hard disk drive; a RAID device; a random access memory (RAM); a read-only memory (ROM); and all forms of flash memory storage devices.

As discussed above, various IO requests (e.g. 10 request 20) may be generated. For example, these IO requests may be sent from client applications 22, 24, 26, 28 to storage system 12. Additionally/alternatively and when storage system 12 is configured as an application server, these IO requests may be internally generated within storage system 12. Examples of IO request 20 may include but are not limited to data write request 106 (i.e. a request that content 108 be written to storage system 12) and data read request 110 (i.e. a request that content 108 be read from storage system 12).

During operation of processing node 100, content 108 to be written to storage system 12 may be processed by processing node 100. Additionally/alternatively and when storage system 12 is configured as an application server, content 108 to be written to storage system 12 may be internally generated by processing node 100.

Processing node 100 may include cache memory system 112. Examples of cache memory system 112 may include but are not limited to a volatile, solid-state, cache memory system (e.g., a static RAM cache memory system) and/or a non-volatile, solid-state, cache memory system (e.g., a flash-based, cache memory system). Processing node 100 may initially store content 108 within cache memory system 112. Depending upon the manner in which cache memory system 112 is configured, processing node 100 may immediately write content 108 to local storage 102 or storage platform 104 (if cache memory system 112 is configured as a write-through cache) or may subsequently write content 108 to local storage 102 or storage platform 104 (if cache memory system 112 is configured as a write-back cache).

Storage system 12 may be configured to include a plurality of processing nodes, each of which may be configured to receive, generate and/or process content (e.g., content 108). For example and in addition to processing node 100, storage system 12 may include one or more additional processing nodes (e.g., processing node 114). An example of processing node 114 may include a processing node within a storage appliance. Processing node 114 may be configured to perform computational tasks and may be configured to store data locally (on local storage 116) or within storage platform 104.

Processing node 114 may include cache memory system 118. Examples of cache memory system 118 may include but are not limited to a volatile, solid-state, cache memory system (e.g., a static RAM cache memory system) and/or a non-volatile, solid-state, cache memory system (e.g., a flash-based, cache memory system). Processing node 114 may initially store content 108 within cache memory system 118. Depending upon the manner in which cache memory system 118 is configured, processing node 114 may immediately write content 108 to local storage 116 or storage platform 104 (if cache memory system 118 is configured as a write-through cache) or may subsequently write content 108 to local storage 116 or storage platform 104 (if cache memory system 118 is configured as a write-back cache).

Processing node 100 and (in this example) processing node 114 may be included within a single storage appliance (e.g., storage appliance 120), thus allowing storage appliance 120 to provide a level of high availability. Processing nodes 110, 114 may be configured in an active-active fashion, wherein each of processing nodes 110, 114 may simultaneously process the various IO requests (e.g. IO request 20). As discussed above, examples of IO request 20 may include but are not limited to data write request 106 (i.e. a request that content 108 be written to storage system 12) and data read request 110 (i.e. a request that content 108 be read from storage system 12).

Storage platform 104 may be constructed of a plurality of discrete storage portions (e.g., discrete storage portions 122), an example of which may include but is not limited to an uber (e.g., a 64 gigabyte portion of storage). Each of these discrete storage portions (e.g., discrete storage portions 122) may be constructed of a plurality of discrete sub-portions (e.g., sub-portions 124), an example of which may include but is not limited to a sub-uber (e.g., an 8 gigabyte portion of storage, eight of which may make up a 64 gigabyte uber). Each of these discrete sub-portions (e.g., sub-portions 124) may be constructed of a plurality of smaller storage portions (e.g., smaller portions 126), an example of which may include but is not limited to a physical large block (e.g., a 2 megabyte portion of storage, four-thousand of which may make up an 8 gigabyte sub-portion).

Figure 3:
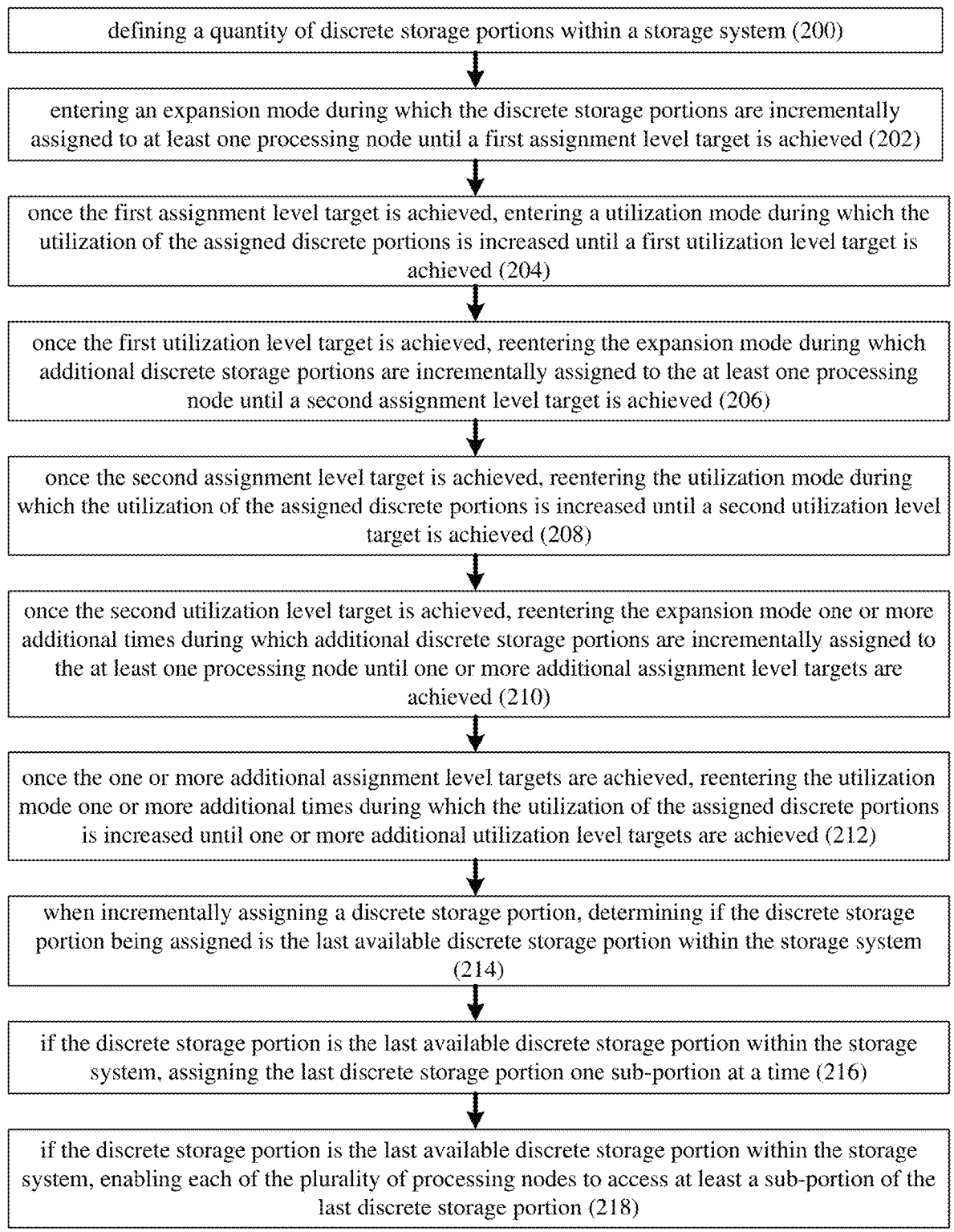
FIG. 3 is a flow chart of the storage management process of FIG. 1.

Storage Management Process:

Referring also to FIG. 3, storage management process 10 may define 200 a quantity of discrete storage portions (e.g., discrete storage portions 122) within a storage system (e.g., storage system 12). As discussed above, storage platform 104 may be constructed of a plurality of discrete storage portions (e.g., discrete storage portions 122), wherein each of the plurality of discrete storage portions (e.g., discrete storage portions 122) may be available to storage management process 10 for storing content (e.g., content 108).

Unfortunately and if left unchecked, content 108 will often be written to a contiguous block of storage space within storage platform 104, as writing all of content 108 to a contiguous block of storage space is less computationally-expensive than breaking content 108 into a plurality of smaller content portions that are written to a plurality of smaller blocks of storage space. Unfortunately, if content is only written to a contiguous block of storage space within storage platform 104, such a writing methodology would result in inefficient use of storage platform 104.

Accordingly and as will be discussed below in greater detail, storage management process 10 may repeatedly switch between an expansion mode (wherein discrete storage portions 122 are assigned for storing content 108) and a utilization mode (wherein the utilization of previously-assigned discrete storage portions 122 is increased by e.g., backfilling unused gaps within previously-assigned discrete storage portions 122 with content).

Figure 4:
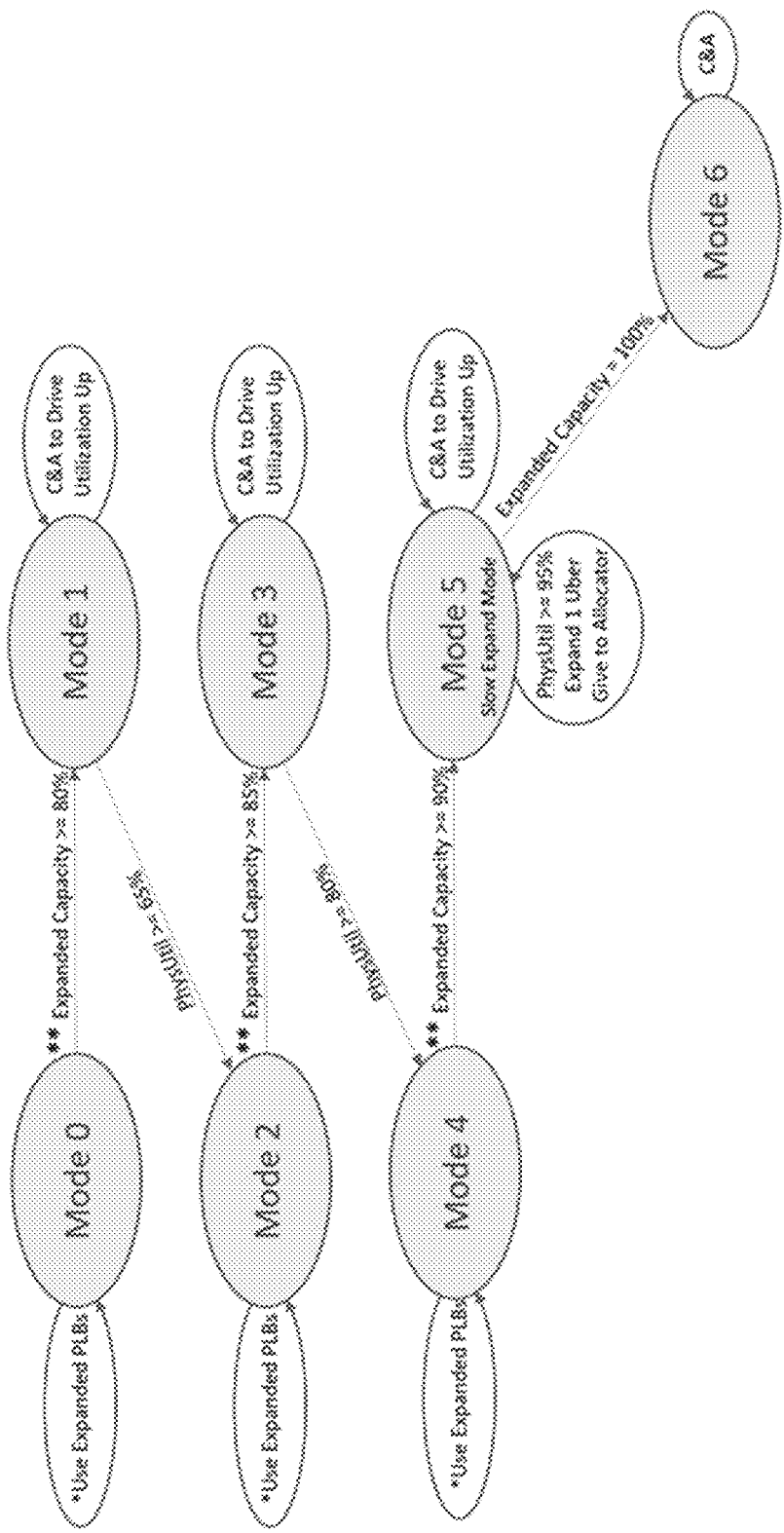
FIG. 4 is a diagrammatic view of various operating modes of the storage system of FIG. 1.

Referring also to FIG. 4, storage management process 10 enter 202 an expansion mode (e.g., Mode 0) during which the discrete storage portions (e.g., discrete storage portions 122) are incrementally assigned to at least one processing node until a first assignment level target is achieved. For the following example, assume that the at least one processing node includes a plurality of processing nodes (e.g., processing nodes 100, 114) within a storage appliance (e.g., storage appliance 120). Further assume that these processing nodes (e.g., processing nodes 100, 114) are configured in an active-active arrangement, wherein both of processing nodes 100, 114 receive and process write requests (e.g., write request 106) and store content (e.g., content 108) within storage platform 104.

The plurality of processing nodes (e.g., processing nodes 100, 114) within the storage appliance (e.g., storage appliance 120) may each enter (and subsequently exit) the expansion mode at essentially the same time and may each enter (and subsequently exit) the utilization mode at essentially the same time. As discussed above, writing content (e.g., content 108) to a contiguous block of storage space (e.g., during an expansion mode) is less computationally-expensive than breaking content 108 into a plurality of smaller content portions that are written to a plurality of smaller bocks of storage space (e.g., during a utilization mode). So if each of processing nodes 100, 114 is in the same mode at the same time, both of processing nodes 100, 114 will each experience similar levels of computational loading.

Assume for illustrative purposes that processing nodes 100, 114 are processing write requests (e.g., write request 106) concerning the storing of content (e.g., content 108) within storage platform 104. Accordingly and when in expansion mode (e.g., Mode 0), storage management process 10 may incrementally assign discrete storage portions (e.g., discrete storage portions 122) to processing nodes 100, 114 for storing content. As discussed above, an example of these discrete storage portions (e.g., discrete storage portions 122) may include but is not limited to an uber (e.g., a 64 gigabyte portion of storage). Each of these discrete storage portions (e.g., discrete storage portions 122) may be constructed of a plurality of discrete sub-portions (e.g., sub-portions 124), an example of which may include but is not limited to a sub-uber (e.g., an 8 gigabyte portion of storage, eight of which may make up a 64 gigabyte uber). Each of these discrete sub-portions (e.g., sub-portions 124) may be constructed of a plurality of smaller storage portions (e.g., smaller portions 126), an example of which may include but is not limited to a physical large block (e.g., a 2 megabyte portion of storage, four-thousand of which may make up an 8 gigabyte sub-portion).

Accordingly, storage management process 10 may utilize these smaller storage portions (e.g., smaller portions 126) and/or sub-portions (e.g., sub-portions 124) and/or discrete storage portions (e.g., discrete storage portions 122) to store content (e.g., content 108) within storage platform 104. While in this expansion mode (e.g., Mode 0), storage management process 10 may monitor the assignment level of these discrete storage portions (e.g., discrete storage portions 122) until a first assignment level target is achieved. For this example, assume that this first assignment level target is 80%. Accordingly, if storage platform 104 includes 1,024 discrete storage portions (e.g., discrete storage portions 122), storage management process 10 may continue to assign discrete storage portions to processing nodes 100, 114 until 820 of the 1,024 discrete storage portions (e.g., discrete storage portions 122) have been assigned.

Once the first assignment level target (e.g., 80%) is achieved, storage management process 10 may enter 204 a utilization mode (e.g., Mode 1) during which the utilization of the assigned discrete portions (e.g., discrete storage portions 122) may be increased until a first utilization level target is achieved. As discussed above and in this illustrative example, each of the discrete storage portions (e.g., discrete storage portions 122) may be 64 gigabytes of storage. Accordingly and in such a situation, the 820 discrete storage portions (which represents 80% of the 1,024 discrete storage portions) would have a capacity of 52.48 gigabytes of storage. Further, assume that due to the above-described utilization inefficiencies associated with writing content to contiguous blocks of storage space, only 29.62 gigabytes of data are written to these 52.48 gigabytes of storage (resulting in a utilization 56.44%). Assume for this illustrative example that the first utilization level target is 65%. Accordingly, since the actual utilization of 56.44% is less than the first utilization level target is 65%, any write requests (e.g., write request 106) for writing content (e.g., content 108) to storage platform 104 would be written in a way to backfill the previously-assigned discrete storage portions until the first utilization level target of 65% is achieved (i.e., until 34.12 gigabytes of data is written to the 52.48 gigabytes of storage). For example, any new inbound content (e.g., content 108) may be broken into smaller portions and used to fill holes in the previously-assigned discrete storage portions. Alternatively/additionally, content already stored within the previously-assigned discrete storage portions may be rearranged to fill holes and/or open up larger contiguous blocks of storage in the previously-assigned discrete storage portions.

Once the first utilization level target (e.g., 65%) is achieved, storage management process 10 may reenter 206 the expansion mode (e.g., Mode 2) during which additional discrete storage portions (e.g., discrete storage portions 122) are incrementally assigned to the at least one processing node (e.g., processing nodes 100, 114) until a second assignment level target is achieved. While in this expansion mode (e.g., Mode 2), storage management process 10 may monitor the assignment level of these discrete storage portions (e.g., discrete storage portions 122) until the second assignment level target is achieved. For this example, assume that this second assignment level target is 85%. Accordingly, if storage platform 104 includes 1,024 discrete storage portions (e.g., discrete storage portions 122), storage management process 10 may continue to assign discrete storage portions to processing nodes 100, 114 until 870 of the 1,024 discrete storage portions (e.g., discrete storage portions 122) have been assigned.

Once the second assignment level target (e.g., 85%) is achieved, storage management process 10 may reenter 208 the utilization mode (e.g., Mode 3) during which the utilization of the assigned discrete portions (e.g., discrete storage portions 122) is increased until a second utilization level target is achieved. Assume for this illustrative example that the second utilization level target is 80%. As discussed above, each of the discrete storage portions (e.g., discrete storage portions 122) may be 64 gigabytes of storage. Accordingly and in such a situation, the 870 discrete storage portions (which represents 85% of the 1,024 discrete storage portions) would have a capacity of 55.68 gigabytes of storage. Assume that 39.12 gigabytes of data are written to these 55.68 gigabytes of storage (resulting in a utilization 70.25%). Accordingly, since the actual utilization of 70.25% is less than the second utilization level target is 80%, any write requests (e.g., write request 106) for writing content (e.g., content 108) to storage platform 104 would be written in a way to backfill the previously-assigned discrete storage portions until the second utilization level target of 80% is achieved (i.e., until 44.54 gigabytes of data is written to the 52.48 gigabytes of storage). As discussed above, any new inbound content (e.g., content 108) may be broken into smaller portions and used to fill holes in the previously-assigned discrete storage portions. Alternatively/additionally, content already stored within the previously-assigned discrete storage portions may be rearranged to fill holes and/or open up larger contiguous blocks of storage in the previously-assigned discrete storage portions.

Once the second utilization level target (e.g., 80%) is achieved, storage management process 10 may reenter 210 the expansion mode (e.g., Mode 4) one or more additional times during which additional discrete storage portions (e.g., discrete storage portions 122) are incrementally assigned to the at least one processing node (e.g., processing nodes 100, 114) until one or more additional assignment level targets are achieved. While in this expansion mode (e.g., Mode 4), storage management process 10 may monitor the assignment level of these discrete storage portions (e.g., discrete storage portions 122) until a third assignment level target is achieved. For this example, assume that this third assignment level target is 90%. Accordingly, if storage platform 104 includes 1,024 discrete storage portions (e.g., discrete storage portions 122), storage management process 10 may continue to assign discrete storage portions to processing nodes 100, 114 until 922 of the 1,024 discrete storage portions (e.g., discrete storage portions 122) have been assigned.

Once the one or more additional assignment level targets (e.g., the third assignment level of 90%) are achieved, storage management process 10 may reenter 212 the utilization mode (e.g., Mode 5) one or more additional times during which the utilization of the assigned discrete portions (e.g., discrete storage portions 122) is increased until one or more additional utilization level targets are achieved. Assume for this illustrative example that a third utilization level target is 95%. As discussed above, each of the discrete storage portions (e.g., discrete storage portions 122) may be 64 gigabytes of storage. Accordingly and in such a situation, the 973 discrete storage portions (which represents 95% of the 1,024 discrete storage portions) would have a capacity of 62.27 gigabytes of storage. Assume that 57.47 gigabytes of data are written to these 62.27 gigabytes of storage (resulting in a utilization 92.30%). Accordingly, since the actual utilization of 92.30% is less than the third utilization level target is 95%, any write requests (e.g., write request 106) for writing content (e.g., content 108) to storage platform 104 would be written in a way to backfill the previously-assigned discrete storage portions until the third utilization level target of 95% is achieved (i.e., until 59.15 gigabytes of data is written to the 62.27 gigabytes of storage). As discussed above, any new inbound content (e.g., content 108) may be broken into smaller portions and used to fill holes in the previously-assigned discrete storage portions. Alternatively/ additionally, content already stored within the previously-assigned discrete storage portions may be rearranged to fill holes and/or open up larger contiguous blocks of storage in the previously-assigned discrete storage portions.

When incrementally assigning (e.g., during Mode 0, Mode 2 or Mode 4) a discrete storage portion (e.g., one of discrete storage portions 122), storage management process 10 may determine 214 if the discrete storage portion (e.g., one or discrete storage portion 122) being assigned is the last available discrete storage portion (e.g., one of the discrete storage portion 122) within the storage system (e.g., storage system 12).

For the following example, assume that the last available discrete storage portion is discrete storage portion 128 and storage management process 10 is incrementally assigning discrete storage portion 128 to the at least one processing node (e.g., processing nodes 100, 114). Accordingly, storage management process 10 may enter a slow expansion mode (e.g., Mode 6), as the assignment level will slowly expand to 100%.

Since discrete storage portion 128 is the last available discrete storage portion within the storage system (e.g., storage system 12), storage management process 10 may assign 216 the last discrete storage portion (e.g., discrete storage portion 128) one sub-portion (e.g., sub-portions 124) at a time. As discussed above, each of these discrete storage portions (e.g., discrete storage portions 122) may be constructed of a plurality of discrete sub-portions (e.g., sub-portions 124), an example of which may include but is not limited to a sub-uber (e.g., an 8 gigabyte portion of storage, eight of which may make up a 64 gigabyte uber). Accordingly, since discrete storage portion 128 is the last available discrete storage portion within the storage system (e.g., storage system 12), storage management process 10 may not assign discrete storage portion 128 in its entirety to the processing node in need of storage space. Alternatively, storage management process 10 may assign 216 the last discrete storage portion (e.g., discrete storage portion 128) one sub-portion (e.g., one of sub-portions 124) at a time. For example, if processing node 100 needed additional storage space, storage management process 10 may assign a first sub-portion (e.g., a first sub-uber) to processing node 100, leaving seven other sub-portions for subsequent assignment to processing nodes in need of storage space.

Accordingly, since discrete storage portion 128 is the last available discrete storage portion within the storage system (e.g., storage system 12), storage management process 10 may enable 218 each of the plurality of processing nodes (e.g., processing nodes 100, 114) to access at least a sub-portion (e.g., one of sub-portions 124) of the last discrete storage portion (e.g., discrete storage portion 128).

By utilizing the above-described system, storage management process 10 maximizes the quantity of unused discrete storage portions (e.g., discrete storage portions 122), thus allowing other systems/processes/tiers in need of an unused discrete storage portion to quickly and easily obtain one (i.e., without needing to wait for one to be made available).

General:

As will be appreciated by one skilled in the art, the present disclosure may be embodied as a method, a system, or a computer program product. Accordingly, the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present disclosure may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium may include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. The computer-usable or computer-readable medium may also be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present disclosure may be written in an object oriented programming language such as Java, Smalltalk, C++ or the like. However, the computer program code for carrying out operations of the present disclosure may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network/a wide area network/the Internet (e.g., network 14).

The present disclosure is described with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, may be implemented by computer program instructions. These computer program instructions may be provided to a processor of a general purpose computer/special purpose computer/other programmable data processing apparatus, such that the instructions, which execute via the processor of the computer or other programmable data processing apparatus, create means for implementing the functions/acts specified in the flowchart and/or block diagram block or blocks.

These computer program instructions may also be stored in a computer-readable memory that may direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowcharts and block diagrams in the figures may illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustrations, and combinations of blocks in the block diagrams and/or flowchart illustrations, may be implemented by special purpose hardware-based systems that perform the specified functions or acts, or combinations of special purpose hardware and computer instructions.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The embodiment was chosen and described in order to best explain the principles of the disclosure and the practical application, and to enable others of ordinary skill in the art to understand the disclosure for various embodiments with various modifications as are suited to the particular use contemplated.

A number of implementations have been described. Having thus described the disclosure of the present application in detail and by reference to embodiments thereof, it will be apparent that modifications and variations are possible without departing from the scope of the disclosure defined in the appended claims.

What is claimed is:

1. A computer-implemented method, executed on a computing device, comprising:
defining a quantity of discrete storage portions within a storage platform of a storage system;
entering a first expansion mode during which the discrete storage portions are incrementally assigned between a plurality of processing nodes of the storage system, for storing content, until a first assignment level target is achieved for the discrete storage portions;
once the first assignment level target is achieved, entering a utilization mode that is separate from the first expansion mode during which the utilization of the assigned discrete storage portions is increased by backfilling unused gaps within the assigned discrete storage portions with new inbound content broken into smaller portions until a first utilization level target is achieved;
once the first utilization level target is achieved, switching from the utilization mode to the first expansion mode during which additional discrete storage portions are incrementally assigned between the plurality of processing nodes until a second assignment level target is achieved for the discrete storage portions,
wherein when incrementally assigning the discrete storage portions between the plurality of processing nodes of the storage system, determining if the discrete storage portion being assigned is a last available discrete storage portion within the storage system; and
in response to determining the last available discrete storage portion, entering a second expansion mode during which the last available discrete storage portion is incrementally assigned by enabling each of the plurality of processing nodes to access and assign at least a sub-portion of a plurality of discrete sub-portions of the last discrete storage portion at a time for storing the content, until an assignment level expands to 100%.

2. The computer-implemented method of claim 1 further comprising:
once the second assignment level target is achieved, reentering the utilization mode during which the utilization of the assigned discrete storage portions is increased until a second utilization level target is achieved.

3. The computer-implemented method of claim 2 further comprising:
once the second utilization level target is achieved, reentering the first expansion mode one or more additional times during which additional discrete storage portions are incrementally assigned to the at least one processing node until one or more additional assignment level targets are achieved; and
once the one or more additional assignment level targets are achieved, reentering the utilization mode one or more additional times during which the utilization of the assigned discrete storage portions is increased until one or more additional utilization level targets are achieved.

4. The computer-implemented method of claim 1 wherein the at least one processing node is one of a plurality of processing nodes within a storage appliance.

5. The computer-implemented method of claim 4 wherein the plurality of processing nodes within the storage appliance each enter the first expansion mode at the same time.

6. The computer-implemented method of claim 4 wherein the plurality of processing nodes within the storage appliance each enter the utilization mode at the same time.

7. The computer-implemented method of claim 1 further comprising:
if the discrete storage portion is the last available discrete storage portion within the storage system, enabling each of the plurality of processing nodes to access at least the sub-portion of the last discrete storage portion.

8. A computer program product residing on a non-transitory computer readable medium having a plurality of instructions stored thereon which, when executed by a processor, cause the processor to perform operations comprising:
defining a quantity of discrete storage portions within a storage platform of a storage system;
entering a first expansion mode during which the discrete storage portions are incrementally assigned between a plurality of processing nodes of the storage system, for storing content, until a first assignment level target is achieved for the discrete storage portions;
once the first assignment level target is achieved, entering a utilization mode that is separate from the first expansion mode during which the utilization of the assigned discrete storage portions is increased by backfilling unused gaps within the assigned discrete storage portions with new inbound content broken into smaller portions until a first utilization level target is achieved;
once the first utilization level target is achieved, switching from the utilization mode to the first expansion mode during which additional discrete storage portions are incrementally assigned between the plurality of processing nodes until a second assignment level target is achieved for the discrete storage portions,
wherein when incrementally assigning the discrete storage portions between the plurality of processing nodes of the storage system, determining if the discrete storage portion being assigned is a last available discrete storage portion within the storage system; and
in response to determining the last available discrete storage portion, entering a second expansion mode during which the last available discrete storage portion is incrementally assigned by enabling each of the plurality of processing nodes to access and assign at least a sub-portion of a plurality of discrete sub-portions of the last discrete storage portion at a time for storing the content, until an assignment level expands to 100%.

9. The computer program product of claim 8 further comprising:
once the second assignment level target is achieved, reentering the utilization mode during which the utilization of the assigned discrete storage portions is increased until a second utilization level target is achieved.

10. The computer program product of claim 9 further comprising:
once the second utilization level target is achieved, reentering the first expansion mode one or more additional times during which additional discrete storage portions are incrementally assigned to the at least one processing node until one or more additional assignment level targets are achieved; and
once the one or more additional assignment level targets are achieved, reentering the utilization mode one or more additional times during which the utilization of the assigned discrete storage portions is increased until one or more additional utilization level targets are achieved.

11. The computer program product of claim 8 wherein the at least one processing node is one of a plurality of processing nodes within a storage appliance.

12. The computer program product of claim 11 wherein the plurality of processing nodes within the storage appliance each enter the first expansion mode at the same time.

13. The computer program product of claim 11 wherein the plurality of processing nodes within the storage appliance each enter the utilization mode at the same time.

14. The computer program product of claim 8 further comprising:
if the discrete storage portion is the last available discrete storage portion within the storage system, enabling each of the plurality of processing nodes to access at least the sub-portion of the last discrete storage portion.

15. A computing system including a processor and memory configured to perform operations comprising:
defining a quantity of discrete storage portions within a storage platform of a storage system;
entering a first expansion mode during which the discrete storage portions are incrementally assigned between a plurality of processing nodes of the storage system, for storing content, until a first assignment level target is achieved for the discrete storage portions;
once the first assignment level target is achieved, entering a utilization mode that is separate from the first expansion mode during which the utilization of the assigned discrete storage portions is increased by backfilling unused gaps within the assigned discrete storage portions with new inbound content broken into smaller portions until a first utilization level target is achieved;
once the first utilization level target is achieved, switching from the utilization mode to the first expansion mode during which additional discrete storage portions are incrementally assigned between the plurality of processing nodes until a second assignment level target is achieved for the discrete storage portions,
wherein when incrementally assigning the discrete storage portions between the plurality of processing nodes of the storage system, determining if the discrete storage portion being assigned is a last available discrete storage portion within the storage system; and
in response to determining the last available discrete storage portion, entering a second expansion mode during which the last available discrete storage portion is incrementally assigned by enabling each of the plurality of processing nodes to access and assign at least a sub-portion of a plurality of discrete sub-portions of the last discrete storage portion at a time for storing the content, until an assignment level expands to 100%.

16. The computing system of claim 15 further comprising:
once the second assignment level target is achieved, reentering the utilization mode during which the utilization of the assigned discrete storage portions is increased until a second utilization level target is achieved.

17. The computing system of claim 16 further comprising:
once the second utilization level target is achieved, reentering the first expansion mode one or more additional times during which additional discrete storage portions are incrementally assigned to the at least one processing node until one or more additional assignment level targets are achieved; and
once the one or more additional assignment level targets are achieved, reentering the utilization mode one or more additional times during which the utilization of the assigned discrete storage portions is increased until one or more additional utilization level targets are achieved.

18. The computing system of claim 15 wherein the at least one processing node is one of a plurality of processing nodes within a storage appliance.

19. The computing system of claim 18 wherein the plurality of processing nodes within the storage appliance each enter the first expansion mode at the same time.

20. The computing system of claim 18 wherein the plurality of processing nodes within the storage appliance each enter the utilization mode at the same time.

21. The computing system of claim 15 further comprising:
if the discrete storage portion is the last available discrete storage portion within the storage system, enabling each of the plurality of processing nodes to access at least the sub-portion of the last discrete storage portion.

* * * * *